United States Patent [19]

Greaney

[11] 4,245,973
[45] Jan. 20, 1981

[54] ARTICLE AND MEANS OF SHAPING ICE CREAM

[76] Inventor: Edward J. Greaney, 43 Abbotsford Ave., Newark, N.J. 07106

[21] Appl. No.: 884,710

[22] Filed: Mar. 7, 1978

[51] Int. Cl.³ .................... A23G 9/00; B65D 85/78
[52] U.S. Cl. ................................. 425/276; 249/117;
249/135; 425/279; 425/281; 425/298; 425/299;
426/565
[58] Field of Search ................ 249/117, 135; 425/298,
425/299, 279, 276, 281; 426/565

[56] References Cited
U.S. PATENT DOCUMENTS

| 18,647 | 11/1857 | Peckham | 425/281 |
|---|---|---|---|
| D. 29,033 | 7/1898 | Smith . | |
| 176,217 | 4/1876 | Collins | 425/298 |
| 1,978,943 | 10/1934 | Harris | 425/279 |
| 2,537,361 | 1/1951 | Massey | 425/279 |
| 3,572,625 | 3/1971 | Williamsen | 249/117 |

Primary Examiner—Lester L. Lee

[57] ABSTRACT

An article of manufacture and process is described which is useful in making ice cream shapes attractive for consumption. Use of these articles permits rapid fabrication of various ice cream products without contamination and permits rapid and effective cleaning of such articles.

8 Claims, 3 Drawing Figures

ARTICLE AND MEANS OF SHAPING ICE CREAM

BACKGROUND OF THE INVENTION

In retail ice cream sales and other activities, it is highly desirable to fabricate ice cream of various shapes rapidly from more or less bulky shapes. This should be achieved without contaminating the ice cream, without introducing undesirable alteration in the taste of the ice cream and without undesirable chemical attack on the instrument used for shaping. Furthermore, ease of cleaning and use of rather strong cleaning agents without adverse effects is highly desirable. In addition, for many situations such as small retail outlets and the like, simplicity, versatility and low cost together with reliability and ease of handling are highly desirable. Particularly in making ice cream cakes and the like, a rapid and simple procedure for making predetermined shapes of ice cream is advantageous. This reduces the time and labor for making such cakes, reduces waiting times and insures rapid service even during times of high demand.

SUMMARY OF THE INVENTION

The invention is an article of manufacture useful for making blocks or slabs of ice cream of particular shape. These shaped slabs of ice cream may be used as is or more often are incorporated into a finished ice cream product such as an ice cream cake. The articles of manufacture may be described as a mold or punching device with walls from one to five inches high with said wall or walls purpendicular to a common base plane. The punching device is open on top and bottom and a holding means or handle is attached to the walls so that the punching device can be operated by hand. It is preferred that the article be made of stainless steel because of its inert chemical properties and excellent physical properties, particularly stiffness of relatively thin sheets. The process involves taking the punching device, causing it to enter into and substantially through a slab of ice cream of desired thickness, removing the punching device containing the ice cream slab of desired shape and removing the shaped ice cream slab. The article of manufacture makes possible rapid and simple fabrication of shaped ice cream slabs, is inert to the ingredients of ice cream and may be exposed to strong detergent and bleach for cleaning without chemical attack.

DETAILED DESCRIPTION

Although the invention may be made of a large variety of materials, stainless steel and more specifically stainless steel of the 300 series is preferred because of excellent corrosion resistance and stiffness. Stainless steel of the 300 series comprises 17 to 25 weight percent chromium, 7 to 21 weight percent nickel and steel. Other substances, including carbon, silicon, molybdenum, columbium, tantalum and cobalt may also be present in small amounts. Stainles steel series 302 (18 weight percent chromium, 9 weight percent nickel and steel) and series 316 (17 weight percent chromium, 12 weight percent nickel and steel) are preferred not only because of there excellent corrosion and ductility properties but because of ease of welding and fabrication.

Thickness of the metal used to fabricate invention may vary over reasonably large limits, such as for example 0.001 to 0.2 inches. Preferred limits in thickness are between 0.010 and 0.050 inches or more preferred from 0.02 to 0.03 inches. These thicknesses give sufficient stiffness without significantly increasing the resistance of the plunger to penetration into the ice cream slab.

Figure 1:
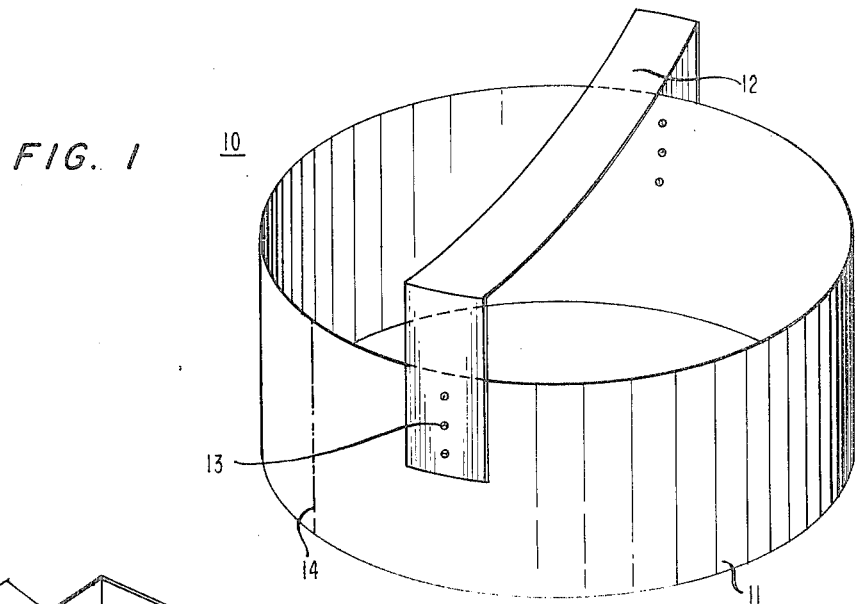
FIG. 1 shows a perspective view of the punching device with a circular cross section.

An understanding of the invention is facilitated by a description of the drawing. The articles shown there are only illustrative of the invention, particularly as to the shape or outline in the cross-sectional plane. FIG. 1 shows a punching device 10 with circular cross-section. The walls 11 are made of stainless steel and are approximately 2 to 3 inches high. The punching device if fitted with a handle 12 for hand operation, generally made from the same or similar sheet of stainless steel as used for the walls. The handle is approximately U shaped, with the longest, middle portion extending the diameter of the plunging device. Each end of the handle is bent at right angles from the longest, middle portion and each end is attached to the wall typically by means of spot welds 13. The wall is closed on itself by attachment means, typically a weld 14 or solder joint (particularly silver solder).

Figure 2:
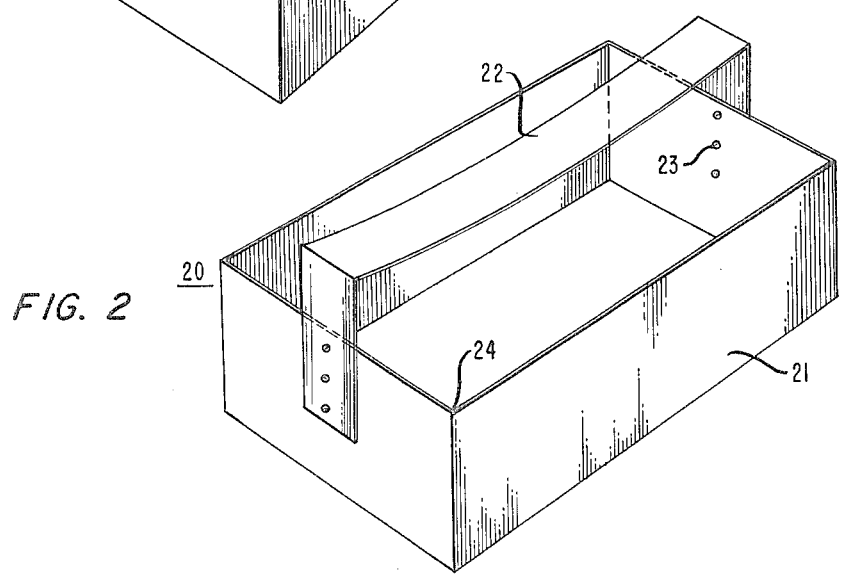
FIG. 2 shows a perspective view of the punching device with rectangular cross section.

FIG. 2 shows a typical plunging device 20 with recangular cross section comprising stainless steel walls 21, handle 22 typically one to two inches wide attached to walls typically by means of spot welds 23. The walls, made of stainless steel sheet metal, are typically two to three inches high and bent into the desired cross-sectional shape. The walls are closed in that they define a bounded area in the cross-sectional plane. The wall closing 24 may be accomplished in a variety of ways including welding, soldering etc.

Figure 3:
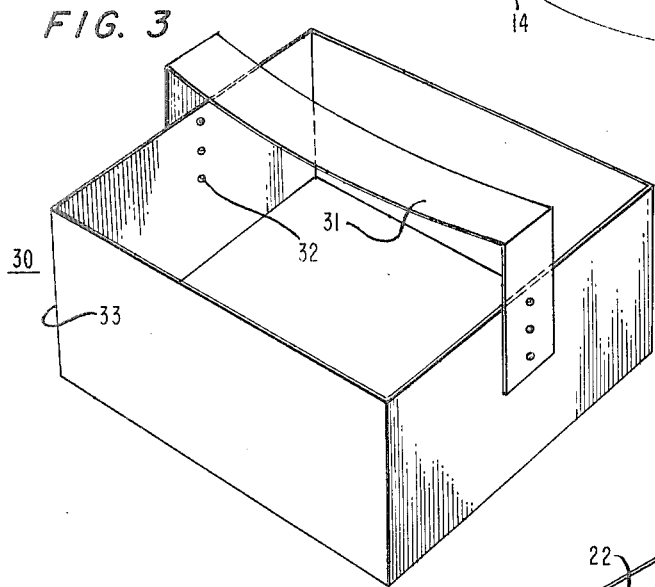
FIG. 3 shows a perspective view of the punching device with square outline.

FIG. 3 shows a similar plunging device 30 with handle 31, spot welds 32 for attaching handle to walls and welded or soldered seam 33.

Although dimensions of the plunging device are not critical, for some applications such dimensions are important. For example, many ice cream cakes are of a certain dimension. Typically, for a circular plunging device, a diameter of approximately eight inches is preferred. For a rectangular plunging device, a length of approximately eight inches and a width of approximately four inches is preferred. For a square plunging device, a length and width of approximately eight inches is preferred.

I claim:

1. An article of manufacture for making shaped slabs of ice cream having a given shape in a cross-sectional plane and walls substantially perpendicular to the cross-sectional plane, said wall consisting of flat stainless steel sheet metal between 0.0001 and 0.2 inches thick, said wall forming an enclosed area in the cross-sectional plane in which a handle is attached to the wall said shape in cross-sectional plane being substantially rectangular and said handle comprising a strip of stainless steel sheet metal one to two inches wide and 0.0001 to 0.2 inches thick, said strip bent at substantially right angles at each end and each end attached to opposite walls.

2. The article of claim 1 in which the strip is attached to the walls by means of spot welds.

3. The article of claim 1 in which the shape in the cross-sectional plane is substantially circular.

4. The article of claim 1 in which the shape in the cross-sectional plane is substantially square.

5. The article of claim 1 in which the thickness of the stainless steel sheet metal is between 0.01 and 0.05 inches.

6. The article of claim 5 in which the thickness of the stainless steel sheet metal is between 0.02 and 0.03 inches.

7. The article of claim 1 in which the stainless steel is of the 300 series.

8. The article of claim 7 in which the stainless steel is either series 302 or series 316.

* * * * *